March 2, 1971     G. A. EKSTROM     3,567,245

VEHICLE SAFETY APPARATUS

Filed May 17, 1968     3 Sheets-Sheet 1

INVENTOR.
GEORGE A. EKSTROM
BY
Young, Flynn & Tarolli
ATTORNEYS

INVENTOR.
GEORGE A. EKSTROM
BY
Yount, Flynn & Tarolli
ATTORNEYS

March 2, 1971  G. A. EKSTROM  3,567,245

VEHICLE SAFETY APPARATUS

Filed May 17, 1968  3 Sheets-Sheet 3

INVENTOR.
GEORGE A. EKSTROM
BY
Yount, Flynn & Tarolli
ATTORNEYS

United States Patent Office 3,567,245
Patented Mar. 2, 1971

3,567,245
VEHICLE SAFETY APPARATUS
George A. Ekstrom, Southfield, Mich., assignor to Eaton
Yale & Towne Inc., Cleveland, Ohio
Filed May 17, 1968, Ser. No. 730,024
Int. Cl. B60r 21/08
U.S. Cl. 280—150                                21 Claims

ABSTRACT OF THE DISCLOSURE

A vehicle safety apparatus protects an occupant of a vehicle during a collision. The safety apparatus includes a confinement which is inflated by the flow from a fluid reservoir and, when inflated, restrains movement of an occupant of the vehicle during the collision. The reservoir includes an opening therein and a plug member is located in the opening. The plug member has a fluid passageway extending therethrough and means for blocking the flow of fluid from the reservoir through the fluid passageway. An explosive is located in the fluid passageway and on detonation provides for flow of fluid through the fluid passageway from the reservoir to the confinement.

---

The present invention relates to a safety apparatus for protecting an occupant of a vehicle during a collision, and particularly relates to a safety apparatus which includes a confinement having a collapsed inoperative condition and an expanded operative condition and which, when in its expanded operative condition, is effective to restrain movement of an occupant of a vehicle during a collision.

A known vehicle safety apparatus includes a confinement having a collapsed inoperative condition and an expanded operative condition. The known safety apparatus includes a fluid reservoir for containing a fluid supply which is released for flow to the confinement to effect expansion of the confinement in response to a sensing of a collision condition. Various attempts have been made in order to simplify the structure for releasing the fluid from the fluid reservoir. However, no structure has previously been developed which is completely satisfactory. The development of a structure for releasing the fluid pressure in the reservoir has included the use of explosive material. However, in the use of the explosive, the noise created by detonation of the explosive, the movement of shrapnel at high speeds into the confinement, and the cost of the explosive have created problems.

Accordingly, the principal object of the present invention is the provision of a new and improved arrangement for releasing the fluid supply in a fluid reservoir for flow to a confinement, and which is simple in construction, low in cost, utilizes explosive material in a manner providing a minimum of noise and is highly reliable.

A still further object of the present invention is the provision of a new and improved arrangement for releasing a fluid supply for flow to a confinement which, when expanded, restrains movement of an occupant of a vehicle during a collision and which arrangement includes a single, simple replaceable plug member which is associated with the fluid reservoir and which may be readily replaced after use by another plug, making the reservoir reusable and easily repaired for reuse.

A further object of the present invention is the provision of a new and improved arrangement for releasing the flow of fluid from a fluid reservoir for flow into a confinement of a safety apparatus and which includes a plug member having a fluid-tight sealing relationship with a reservoir, and wherein the plug member has a fluid passageway for directing fluid from the reservoir to the confinement and there is means on the plug for blocking the flow of fluid through the passageway and an explosive means located in the fluid passageway and carried by the plug is operable upon activation thereof to enable fluid to flow from the reservoir through the fluid passageway.

A still further object of the present invention is the provision of a new and improved safety apparatus which includes a confinement having a collapsed inoperative condition and an expanded operative condition in which it restrains movement of an occupant of a vehicle during a collision, and wherein a fluid reservoir contains a supply of fluid for expanding the confinement, with the supply of fluid being released from the fluid reservoir upon activation of an explosive means which is supported in a friable or fragmentable material which is disintegrated or comminuted by the activation of the explosive means.

A further object of the present invention is the provision of a new and improved safety apparatus, as noted in the next preceding paragraph, wherein the friable material is a highly incompressible material and has qualities so as to minimize the sound of the explosive material and also supports the explosive material in the proper location with respect to the reservoir.

A still further object of the present invention is the provision of a new and improved vehicle safety apparatus which includes a confinement and a fluid reservoir for containing a supply of fluid for effecting expansion of the confinement and wherein an explosive which is supported in a body of resilient elastomeric friable material effects the formation of an opening in the reservoir and wherein the explosive crumbles or comminutes the friable material upon detonation.

A further object of the present invention is the provision of a new and improved vehicle safety apparatus which includes a confinement having a collapsed inoperative condition and an expanded operative condition and wherein the confinement, when in its expanded operative condition, is operable to restrain movement of an occupant of a vehicle during a collision, and wherein a fluid reservoir is provided for containing a supply of fluid for inflating the confinement and wherein the fluid reservoir is a "zero reaction" reservoir.

A still further object of the present invention is the provision of a new and improved vehicle safety apparatus which includes a confinement having a collapsed inoperative condition and an expanded operative condition and wherein a fluid reservoir is provided for effecting expansion of the confinement and wherein the fluid reservoir has a plug member located therein which has a wall portion blocking flow or fluid from the reservoir into a fluid passageway, and wherein explosive means is provided for effecting removal of the wall of the plug and enabling fluid to flow from the fluid reservoir into the fluid passageway, and the wall of the plug includes means for causing the wall of the plug to become fragmented into small pieces of a size smaller than the transverse dimension of the fluid passageway through the plug member so that small fragments are not stuck in the fluid passageway in the plug.

Further objects and advantages of the present invention will be apparent from the following detailed description of preferred embodiments of the present invention and with reference to the accompanying drawing wherein.

The present invention provides a new and improved safety apparatus for protecting an occupant of a vehicle during a collision. The safety apparatus includes a confinement having a collapsed inoperative condition and an expanded operative condition. The confinement, when in its expanded operative condition, is operable to restrain movement of an occupant of a vehicle during a collision. The confinement is expanded by the flow of fluid from a fluid reservoir which contains a fluid supply. The present invention provides a highly improved structural arrangement for effecting the release of the fluid from the fluid reservoir to the confinement to effect expansion thereof.

Figure 1:
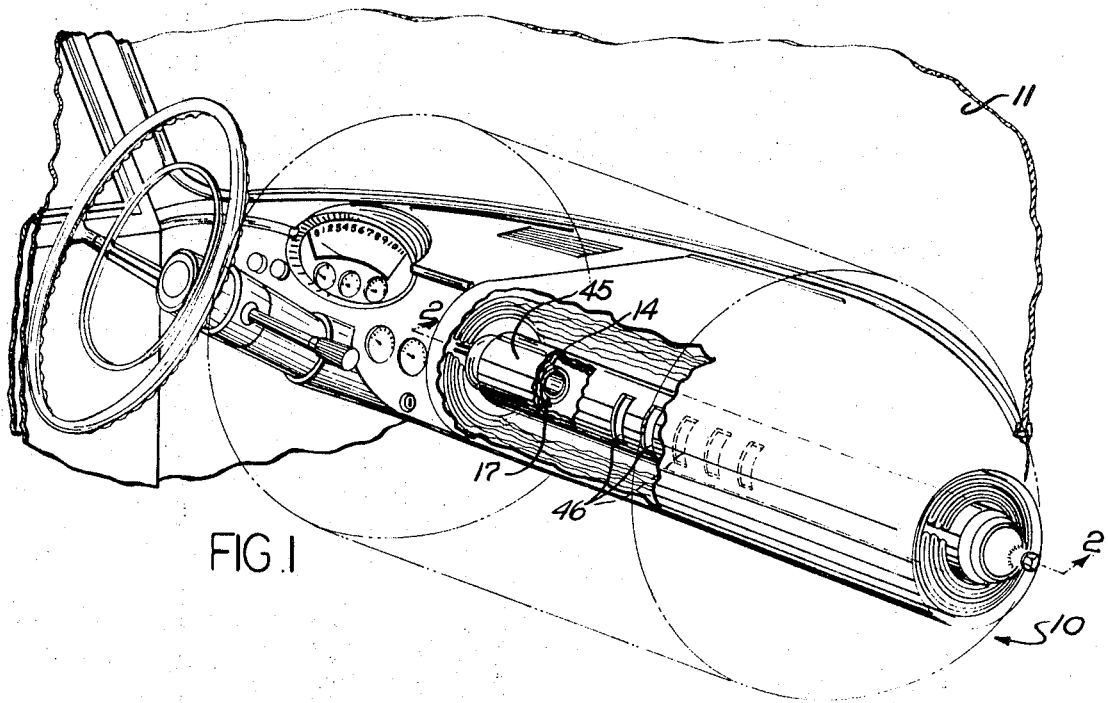
FIG. 1 is a schematic perspective view of a vehicle safety apparatus applied to a vehicle and embodying the present invention.

As representing a preferred embodiment of the present invention, FIG. 1 illustrates a vehicle safety apparatus, generally designated 10, applied to an automotive vehicle 11. The safety apparatus 10 is associated with the dashboard of the vehicle 11 and includes a confinement 12. The confinement 12 has a collapsed inoperative condition, illustrated in full lines in FIG. 1, and an expanded operative condition, illustrated in dot-dash line in FIG. 1. The confinement, when in its expanded operative condition, is effective to restrain forward movement of an occupant of the vehicle into a structural part of the vehicle during a collision.

The fluid which effects expansion of the confinement 12 from its collapsed inoperative condition to its expanded operative condition is contained in a fluid reservoir 14 which is located interiorly of the confinement 12. The reservoir 14 is of a generally cylindrical shape and has a longitudinal axis which extends along the dashboard of the vehicle. The reservoir 14 has a fill hole 16 at one end thereof, and includes means 17 at the other end thereof for effecting the release of the fluid in the reservoir for flow to the confinement.

The means 17 for effecting release of the fluid in the reservoir 14 and thus providing for the flow of fluid from the reservoir 14 includes a plug member, generally designated 20. The plug member 20 has a body portion 21 which is threadedly engaged in a threaded boss portion 22 of the reservoir 14. The threaded connection between the body 21 of the plug and the boss portion 22 of the reservoir provides a fluid-tight seal between the reservoir 14 and the plug 20 which prevents flow of fluid from the reservoir. The body 21 of the plug 20 has a head portion 23 on the outer end thereof.

The body portion 21 and the head portion 23 of the plug define fluid passageways which direct fluid flow from the reservoir 14 outwardly thereof. The fluid passageways in the plug include an axially extending fluid passageway or bore 25 which opens at one end 25a into the reservoir 14. The other end of the bore 25 communicates with a plurality of opposed, diametrically extending fluid passageways 26–29. The axis of the bore 25 is substantially located on the longitudinal axis of the reservoir 14. The fluid passageways 26–29 are of substantially equal transverse dimension and each is located diametrically opposite to another one of the fluid passageways. This provides a zero reaction on the reservoir due to flow therefrom. These fluid passageways 26–29 direct the flow of fluid radially of the axis of the plug member 20 and the axis of the reservoir 14. While there are four fluid passageways 26–29 in the illustrated embodiment of the invention, it is contemplated that a different number of diametrically opposed fluid passageways might be provided and still attain the zero reaction. Moreover, an odd number of openings, spaced circumferentially apart equally, would also provide dynamic balance when fluid flows.

Figure 2:
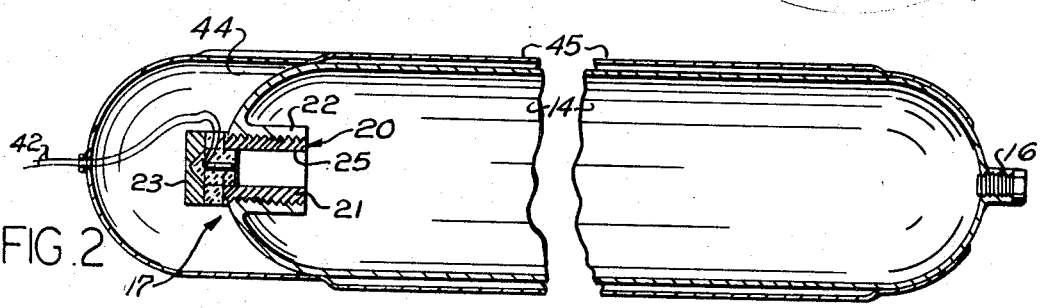
FIG. 2 is a longitudinal sectional view of the vehicle safety apparatus shown in FIG. 1, taken approximately along the section line 2—2 of FIG. 1.
Figure 3:
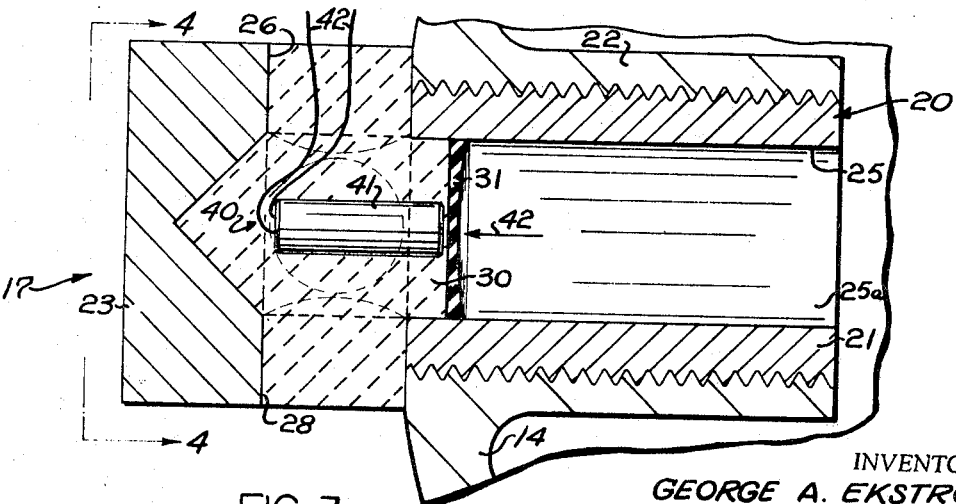
FIG. 3 is an enlarged fragmentary sectional view of a portion of the apparatus shown in FIG. 2.
Figure 4:
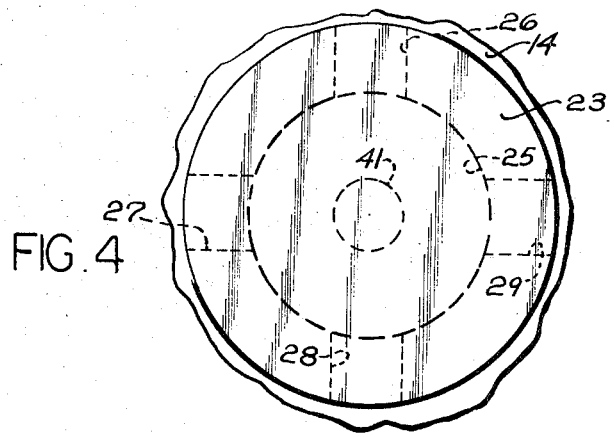
FIG. 4 is an end view of the structure shown in FIG. 3, as indicated by the arrow 4—4.

In order to block the flow of fluid from the reservoir 14 outwardly thereof, the means 17 includes means on the plug 20 for blocking flow of fluid from the reservoir 14 through the fluid passageways 26–29. The means for blocking the flow of fluid from the reservoir 14 through the fluid passageways 26–29 comprises a friable or fragmentable material, generally designated 30, which is capable of being disintegrated or comminuted from a unitary structure to small pieces or particles. In the embodiment of the invention shown in FIG. 3, the friable material 30 is a highly incompressible material which may be poured into the bore 25 as a slurry and after pouring coalesces and hardens. Although any suitable high incompressible material may be used, it is advantageously a material which, when it dries, has a very small coefficient of contraction, so that the material may be positioned or located in a wet state in the passageways in the plug 20 and dried therein, without any substantial shrinking thereof. This characteristic of the material enables a sealing relationship to be maintained between the walls defining the passageways 26–29 and the material. In the event, however, that the highly incompressible material in and of itself does not maintain such a fluid-tight seal, a suitable additional seal 31 may be provided. One such seal 31 is shown in FIGS. 2 and 3 located in the passageway 25 and abutting the material 30. The seal 31 has a fluid-tight sealing relationship with the walls defining the passageway 25 and prevents fluid flow through the passageway 25 from the reservoir 14.

The structural arrangement 17 providing for flow of fluid from the fluid reservoir 14 outwardly thereof also includes an explosive means, generally designated 40. The explosive means 40 includes an explosive charge 41 which is embedded in the material 30 and located generally centrally therein. The explosive charge 41 is connected by suitable leads 42 to a sensing device which senses a condition indicating that the vehicle is encountering a collision, or that a collision is imminent. Upon a sensing of such a condition, a circuit is completed through the conductors 42 effecting detonation of the explosive charge 41. Upon detonation of the explosive charge 41, the material 30 fragments or crumbles and loses all of its structural strength. The fluid pressure in the reservoir 14 is of such a pressure that it is capable of forcing the material radially through the fluid passageways 26–29 and effecting movement of the seal 31 outwardly in the direction of the arrow 42 shown in FIG. 3. In this manner, the fluid then flows through the fluid passageway 25 and through the radially extending passageways 26–29. In view of the fact that the explosive charge 41 functions merely to effect a fragmenting or crumbling of the material 30, the explosive charge may be relatively small.

As the fluid flows through the radially extending passageways 26–29, it is directed into a chamber 44 which is defined by an elongate diffuser member 45 which encircles the reservoir 14. The diffuser member 45 is a generally cylindrical member having a longitudinal axis which is concentric to the longitudinal axis of the reservoir member 14. The diffuser member 45, moreover, has a plurality of openings 46 which are spaced apart along the longitudinal axis of the diffuser member and which direct flow of fluid outwardly thereof and directly into the confinement. In view of the fact that the reservoir and diffuser member 45 are located in the confinement 12, it is equally clear that the openings 46 in the diffuser member are likewise located in the confinement 12.

When fluid is flowing under pressure through the fluid passageways 26–29, reaction forces are applied to the reservoir 14. To minimize the effect of these reaction forces on the reservoir 14, the relationship of the fluid passageways 26–29 to each other and the diffuser member 45 is such as to offset the reaction forces against each other to provide a substantially zero resultant reaction force on the reservoir 14.

To this end, the passageways 26–29 are of substantially the same size and are located to direct fluid in opposite directions. Since the generally cylindrical diffuser member 45 is coaxial with the reservoir 14, the flow of fluid impinges perpendicularly against the inner surface of the diffuser member. Due to this arrangement of the passageways 26–29 and diffuser member 45, the reaction forces acting on the reservoir 14 oppose each other and do not tend to effect movement of the reservoir due to the high-speed fluid flow from the reservoir 14. As noted above, other flow arrangements can also provide this zero reaction.

It should be apparent, of course, that prior to the detonation of the explosive charge 41, the forces applied by the fluid pressure in the reservoir 14 against the friable or fragmentable material 30 are adsorbed or resisted by the massive head 23 of the plug member 20 and that there are no radially directed forces caused by the fluid pressure in the reservoir tending to force the material 30 radially through the openings 26–29.

The fact that the explosive charge 41 may be relatively small minimizes the cost involved and also minimizes the noise produced upon detonation of the explosive. Moreover, the friable or fragmentable material 30 has a sound-adsorbing quality which will adsorb and muffle part of the sound of the explosive material, and also is highly reliable in supporting and protecting the explosive material, providing for reliable operation after many years.

Figure 5:
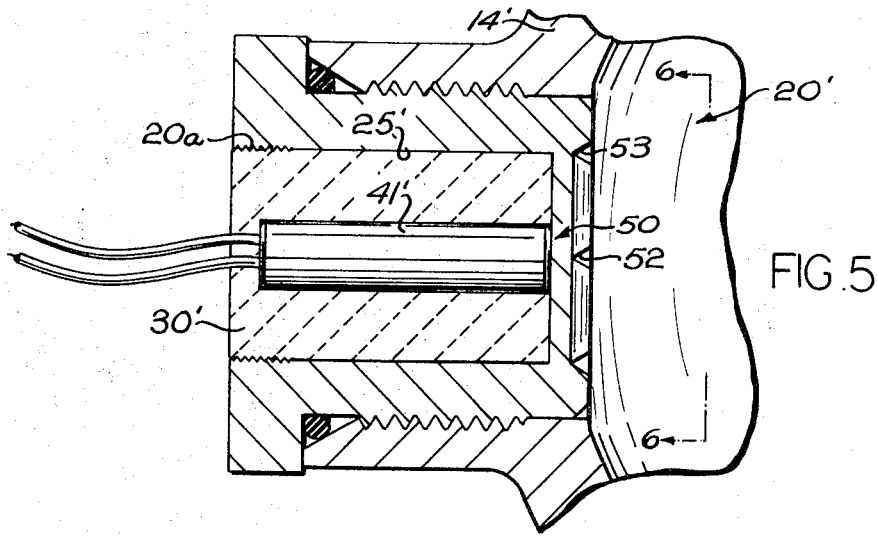
FIG. 5 illustrates a modified embodiment of the present invention.
Figure 6:
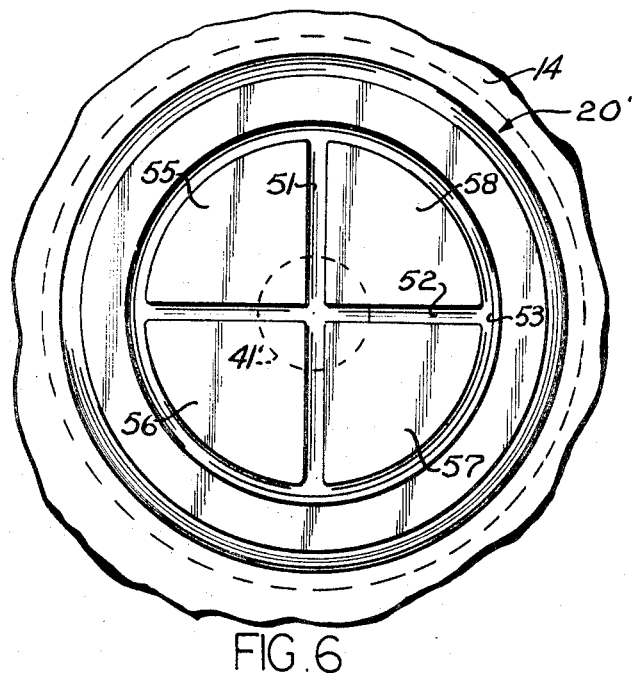
FIG. 6 is an end elevational view on an enlarged scale, looking at the structure shown in FIG. 5 as indicated by the line 6—6.

A modified embodiment of the present invention is illustrated in FIGS. 5 and 6. The modified embodiment of the present invention includes a fluid reservoir 14′ and a plug member 20′ which is threaded into an opening in the fluid reservoir 14′ and has a fluid-tight association therewith. The plug member 20′ has a fluid passageway 25′ extending therethrough. The plug member 20′ also includes means on the plug for blocking the flow of fluid from the fluid reservoir 14′ through the fluid passageway 25′. This means is in the form of a wall 50 which closes the end of the passageway 25′. In this embodiment of the invention, the wall 50 is provided with a plurality of grooves 51, 52 and 53 on the exterior thereof. The grooves 51, 52 are radially extending grooves which cross each other, and the groove 53 is a circular peripheral groove which intersects the opposite ends of the cross grooves 51, 52. The grooves 51–53 define pie-shaped wall portions 55, 56, 57 and 58. These pie-shaped wall portions have their largest dimension substantially smaller than the transverse dimension of the fluid passageway 25′. As described below, under certain circumstances, the groove 53 is not required.

Figure 7:
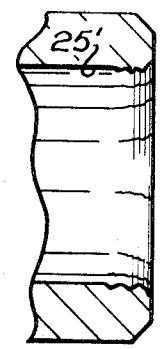
FIG. 7 is a fragmentary sectional view of the embodiment shown in FIG. 5 after detonation of the explosive.

In order to effect the release of the wall 50 to provide for fluid flow from the reservoir 14′ through the fluid passageway 25′, an explosive charge 41′ is supported in the fluid passageway 25′ and particularly is supported therein by a highly incompressible, friable or fragmentable material designated 30′. Upon detonation of the explosive charge 41′, the material 30′ is fragmented and the wall 50 is likewise fragmented. The wall 50 tends to break along the grooves 51–53 and, therefore, tends to provide separate pie-shaped pieces 55–58 upon detonation of the explosive charge 41′. The pie-shaped pieces 55–58 are of such a size that they will readily move through the fluid passageway 25′. As a result, these pie-shaped pieces will not block the flow of fluid from the reservoir 14′, as could occur if the wall 50 were removed without being fragmented. Although the pie-shaped pieces 55–58 are shown as being formed by grooves in the wall 50, it is contemplated that the pieces 55–58 could be formed by weakening the wall in other ways, such as by forming both internal and external grooves in the wall or providing the wall with relatively thick portions. FIG. 7 illustrates the plug 20′ after detonation of the explosive material 30′.

The grooves 51–53 do weaken the wall portion 50 and in the event the fluid pressure would be sufficient to force the wall portions 55–58 outwardly, the material 30′ can resist such outward movement. To facilitate such resistance, ridges or grooves 25a, FIG. 5, can be provided in the wall defining the passageway 25′ and in which the material 30′ becomes located. If the end wall 50 is too thin to safely support the pressure in the reservoir, the highly incompressible friable material 30′ will support the end wall 50 against the pressure. If the end wall 50 is of sufficient strength to support the pressure, then other materials may be used to support the explosive, but a larger explosive charge may be required to shear the wall 50.

Figure 8:
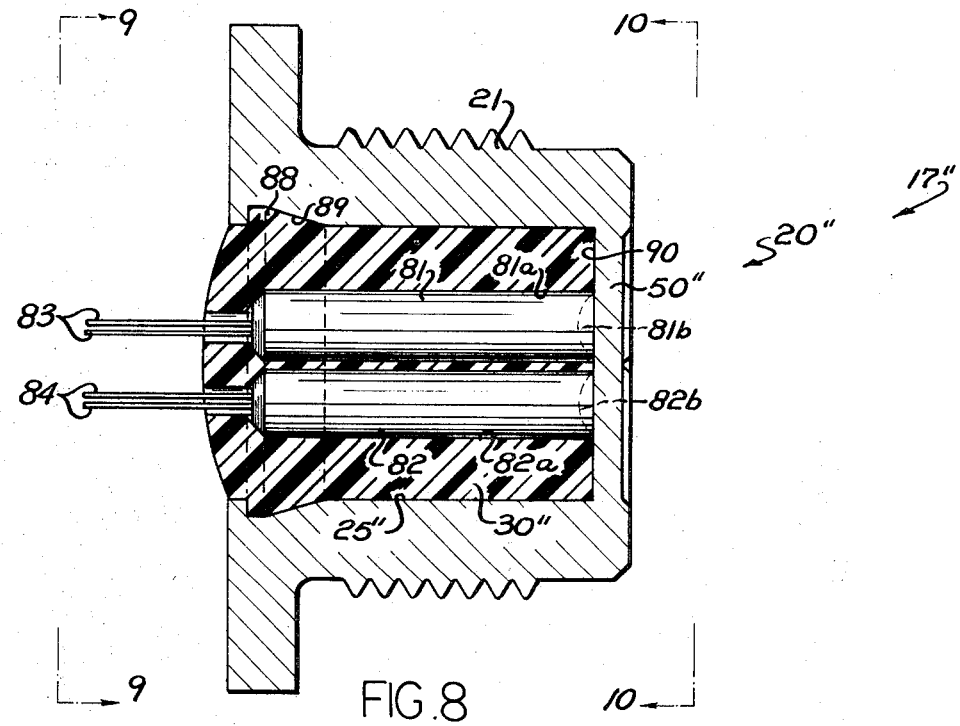
FIG. 8 is a sectional view, similar to FIG. 5, of another embodiment of the invention.
Figure 9:
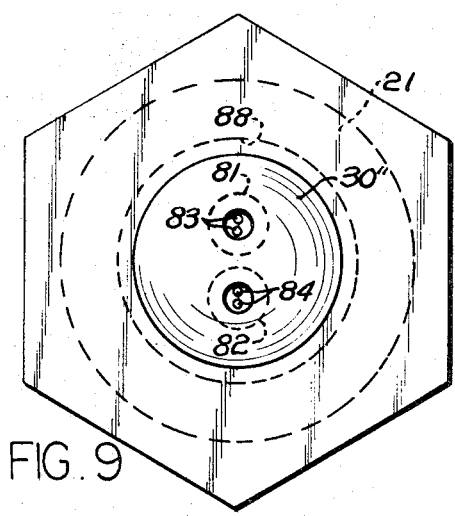
FIG. 9 is an end view, on a reduced scale, taken along the line 9—9 of FIG. 8.
Figure 10:
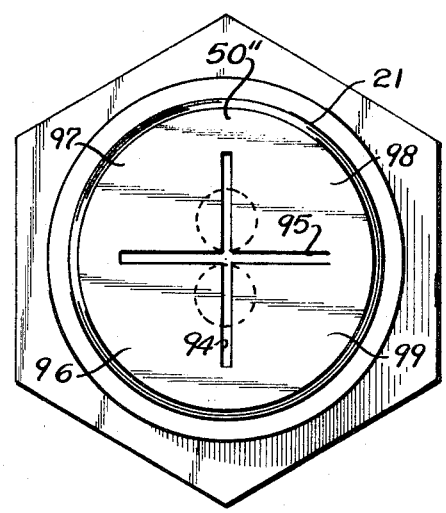
FIG. 10 is an end view, on a reduced scale, taken along the line 10—10 of FIG. 8.
Figure 11:
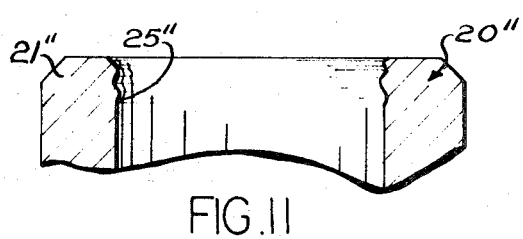
FIG. 11 is a fragmentary sectional view of the embodiment shown in FIG. 8 after detonation of the explosive.

Another embodiment of the invention is shown in FIGS. 7–9, the embodiment of FIGS. 7–9 being generally similar to the embodiment of FIGS. 5 and 6. In the embodiment of FIGS. 7–9, the same numerals are used to designate like parts, however, the suffix (″) is employed to distinguish the elements associated with FIGS. 7–9. In the embodiment of FIGS. 7–9, a plug member 20″ is threadably engaged in a threaded boss in an associated reservoir. The plug member 20″ has a longitudinally extending fluid passageway or bore 25″ which terminates at a transversely extending wall 50″.

A body or insert 30″ is located within the bore 25″ and supports a pair of explosive charges 81 and 82 which are generally similar to the single explosive charge 41 of FIG. 3. The insert 30″ does not support the end wall 50″ of the plug against the pressure of the fluid in the reservoir. The explosive charges 81 and 82 are connected by suitable leads 83 and 84 to a circuit which is completed upon the occurrence or imminence of a collision to activate or detonate the explosive charges 81 and 82. Either of the two explosive charges upon detonation is capable of fragmenting the wall 50″ to enable fluid to flow from the associated reservoir through the passage 25″ and into an associated diffuser and confinement. For purposes of supporting the charges 81 and 82, the insert 30″ is provided with chambers 81a, 82a, respectively, which are sized so that the ends 81b, 82b of the charges 81, 82 are closely adjacent the wall 50″. In this manner, the charges can be maintained relatively small and are most effective. The ends 81b, 82b of the charges are shaped, as shown in dotted lines (FIG. 7) and thus direct explosive forces against the wall 50″. The provision of a plurality of explosive charges, each of which is capable upon detonation of effecting a flow of fluid from the associated reservoir, ensures that the reservoir will be opened upon the occurrence of an accident even if one of the explosive charges should fail to detonate due to some unforeseen circumstance, and providing that the same unforeseen circumstance did not affect the other charge.

The insert 30″ which positions the explosive charges 81, 82 is, in the embodiment of the invention shown in FIGS. 7–9, formed of a friable material which breaks or is comminuted upon detonation of the explosive charge 81 or 82. More specifically, the insert is made of an elastomeric material with this property. The elastomeric material is comminuted into a large number of pieces or particles which are blown out of the passage 25" by a flow of fluid through the passage upon a fracturing or rupturing of the end wall 50". There are many different types of elastomeric materials both natural and synthetic which could be used. By experimentation it has been found that a silastic B RTV rubber having an elongation percent of 120 and a tear strength of 30 p.p.i. provides the desired characteristics.

As shown in FIG. 7, the insert 30" has a shoulder 88 which cooperates with a recess 89 on the plug 21" to maintain the elastomeric material 30" in the bore 25" until the detonation of the explosives charges 81 and 82. Although the use of an elastomeric material has been found to be particularly advantageous for supporting the explosive charges 81 and 82, it is contemplated that other materials, such as plastics, could be used. The basic requirements for the material is that it must comminute into small enough pieces to easily pass through the slots 46 of the diffuser 45 (see FIG. 1) upon detonation of the explosive charges. Moreover, the RTV rubber particles, due to their resilience, will not damage the confinement when they are forced into the confinement by the fluid flow.

The end wall 50" (see FIG. 9) is weakened by a pair of grooves or recesses 94 and 95 which intersect at the center of the wall 50". It should be noted that an annular recess, corresponding to the recess 53 of FIG. 6, is not provided in the embodiment of FIGS. 7–9. However, upon detonation of the explosive charges 81 and 82, the weakened portions 94 and 95 are ruptured and four segments, indicated at 96–99 in FIG. 9, are formed due to the force of the explosion to enable the fluid in the reservoir to flow through the bore 25" upon the disintegration of a friable elastomeric material 30". The recess 53 of FIG. 6 is not required since the wall thickness between the bore 25 and the outer diameter of the plug 20" is sufficient to prevent bending of the pie sections upon detonation of the explosive, and as a result, shear failure occurs at the diameter of bore 25.

The friable insert 30" in the embodiment shown in FIG. 8 may be of any suitable shape. For example, it could have a triangular shape or a cruciform shape. If an insert member such as 30" is not utilized, then the explosive forces upon detonation of the charges 81, 82 may not act with sufficient force against the wall 50" to effect a shearing thereof, and, therefore, the friable insert 30" controls the formation of the opening in the plug 20". From the above, it should be apparent that the inserts 30 and 30' of FIGS. 2 and 5, respectively, also control the formation of the opening. It should further be apparent that the plugs 20, 20' and 20" in the described embodiments provide a closed fluid reservoir and the formation of an opening in the plug constitutes the formation of an opening in the reservoir.

In view of the foregoing, it should be readily apparent that applicant has provided new and improved embodiments of a vehicle safety apparatus, and particularly new and improved arrangements for effecting fluid flow from a fluid reservoir to effect inflation of a confinement on an automotive vehicle. This safety apparatus includes a plug 20 having an explosive charge 41 supported in a friable material 30. Detonation or activation of the explosive charge 41 disintegrates the friable material 30 to enable fluid to flow from the reservoir 14. Although the friable material 30 has taken the form of a highly incompressible material in one illustrated embodiment of the invention and an elastomeric material in another illustrated embodiment of the invention, it is contemplated that other materials which disintegrate upon activation of the explosive charge 41 could be used. The fluid flows out of the reservoir 14 through opposed passages 26–29 to provide a substantially zero resultant reaction force on the reservoir.

Having described my invention, I claim:

1. In a safety apparatus for protecting an occupant of a vehicle which includes confinement means having a collapsed inoperative condition and an expanded operative condition in which the confinement means is operable to restrain movement of an occupant during a collision, a fluid reservoir having an opening therein, a plug member associated with said opening in said reservoir and having a fluid-tight sealing relationship with said reservoir, said plug member having a body defining a fluid passageway therein for directing fluid from said reservoir to said said confinement, friable material located in said fluid passageway, means separating said friable material from the fluid in said fluid reservoir, and explosive means carried by said friable material and located in said fluid passageway and operable upon activation thereof to crumble said friable material and enable fluid to flow from said reservoir through said fluid passageway to said confinement to effect expansion thereof.

2. In a safety apparatus as defined in claim 1 wherein said friable material is a highly incompressible material which crumbles by activation of said explosive means.

3. In a safety apparatus as defined in claim 1 wherein said friable material is an elastomeric material which crumbles by activation of said explosive means.

4. In a safety apparatus as defined in claim 1 wherein said fluid passageway in said reservoir includes an axially extending main passage portion and radially extending fluid passageways communicating therewith, the radially extending passageways being of generally the same transverse dimension and spaced equally from each other circumferentially of said main passage portion so as to provide a fluid reservoir of substantially zero reaction.

5. In a safety apparatus as defined in claim 4, wherein said friable material is disposed in said axially extending passageway portions and said radially extending passageway portions.

6. In a safety apparatus as defined in claim 4, wherein the fluid pressure in said reservoir acts against said means for separating said friable material and the fluid in said reservoir and said friable material transmits said pressure to and is resisted by a head portion of said plug member so that no force from said fluid pressure is directed against said friable material so as to force it through said radial passageways.

7. In a safety apparatus as defined in claim 1, wherein said explosive means is supported in said friable material and upon detonation of said explosive means the fluid pressure in said fluid reservoir forces said friable material outwardly through said fluid passageway.

8. In a safety apparatus as defined in claim 1 wherein said friable material comprises elastomeric material located in said passageway, said explosive means being supported in said elastomeric material so that upon detonation of said explosive means said elastomeric material fragments.

9. In a safety apparatus as defined in claim 1 wherein said means for separating said friable material from the fluid in said fluid reservoir comprises a wall portion of said plug member.

10. In a safety apparatus as defined in claim 9 wherein said wall portion of said plug member has a plurality of weakened areas and said explosive means upon activation breaks said wall portion along said weakened areas so as to provide a plurality of pieces of a size less than the transverse dimension of said fluid passageway to facilitate movement of said pieces through said passageway without being lodged therein.

11. In a safety apparatus as defined in claim 9 wherein said explosive means is supported in said friable material located in said fluid passageway so that activation of said explosive means also breaks said friable material into a plurality of pieces.

12. In a safety apparatus for protecting an occupant of a vehicle and which includes confinement means having a collapsed inoperative condition and an expanded operative condition in which the confinement means is operable to restrain movement of an occupant of a vehicle during a collision, a fluid reservoir for containing a fluid supply, said fluid reservoir having an opening therein, a plug member associated with said opening in said reservoir and having a fluid-tight sealing relationship with said reservoir, said plug member having a body defining a fluid passageway therein for directing fluid from said reservoir to said confinement, wall means on said plug member blocking flow of fluid from said reservoir through said fluid passageway, explosive means supported adjacent said wall means, said wall means having means providing for fragmentation thereof into pieces smaller than said fluid passageway upon activation of said explosive means thereby enabling fluid to flow from said reservoir through said fluid passageway to said confinement to effect expansion thereof without blocking of said fluid passageway by said pieces.

13. In safety apparatus as defined in claim 12 wherein said explosive means is carried by said plug member and located in said passageway.

14. In safety apparatus as defined in claim 12 wherein said explosive means is supported by a body of friable material located in said fluid passageway.

15. In safety apparatus as defined in claim 12 wherein said means providing for fragmentation of said wall into pieces smaller than the fluid passageway comprises a plurality of grooves located in said wall and defining weakened portions thereof which rupture upon activation of said explosive means.

16. In an apparatus having a reservoir for providing a fluid supply and a plug member with a passageway therein positionable in an opening in the reservoir and operable to control the flow of fluid from the reservoir, the improvement comprising a body of friable material located in said passageway, an explosive charge supported by said body of friable material and located in said passageway, said plug member having an end wall for providing a fluid sealing relationship with the reservoir and which closes said passageway to separate said friable material from the fluid in the reservoir and prevents the flow of fluid from the reservoir through said passageway, said body of friable material and said end wall fracturing upon detonation of said explosive charge to enable fluid to flow through said passageway from the reservoir.

17. In an apparatus as defined in claim 16 wherein said friable material comprises elastomeric material and said end wall has a plurality of weakened areas so that detonation of said explosive charge fractures said end wall along said weakened areas so as to provide a plurality of pieces of a size less than the transverse dimension of said passageway to facilitate movement of said pieces through said passageway without being lodged therein.

18. In a safety apparatus for protecting an occupant of a vehicle and which includes confinement means having a collapsed inoperative condition and an expanded operative condition in which the confinement means is operable to restrain movement of an occupant of a vehicle during a collision, a reservoir for holding a supply of fluid to effect expansion of said confinement means, and plug means associated with said reservoir and having a passageway through which fluid flows from said reservoir to said confinement, said plug means including a wall portion extending across and disposed in a sealing relationship with said passageway, said wall portion having a surface exposed to the fluid under pressure in the reservoir and having insufficient structural strength to withstand the pressure applied to said surface by the fluid in said reservoir, said plug means further including a body of friable material disposed in a supporting relationship with said wall portion on a side of said wall portion opposite from said surface which is exposed to the fluid under pressure within the reservoir to thereby reinforce said wall portion to withstand the pressure applied to said surface of said wall portion by the fluid in said reservoir, and explosive means disposed at least partially within said body of friable material and detonatable to fracture said body of friable material to thereby effect operation of said plug means to the second condition to enable fluid to flow from said reservoir to effect operation of said confinement means to the expanded condition.

19. In a safety apparatus as defined in claim 18 wherein said friable material is a highly incompressible material and detonation of said explosive means and fragmentation of said friable material enables the fluid pressure in said reservoir to effect movement of said wall portion to thereby effect operation of said plug means to said second condition.

20. In a safety apparatus for protecting an occupant of a vehicle which includes confinement means having a collapse inoperative condition and an expanded operative condition in which the confinement means is operable to restrain movement of an occupant during a collision, a fluid reservoir having an opening therein, a plug member associated with said opening in said reservoir and having a fluid tight sealing relationship with said reservoir, said plug member having a body defining fluid passageways therein for directing fluid from said reservoir to said confinement, wall means disposed at one end of said passageway and operable to block the flow of fluid from said reservoir through said fluid passageway, friable material located in said fluid passageway, explosive means carried by said friable material and supported adjacent to said wall means, said fluid passageways including an axial passageway and said explosive means including a plurality of explosive members disposed axially in said fluid passageway so that the ends thereof are located adjacent said wall member so that actuation of said explosive members crumbles said friable material and fragmentates said wall means to thereby enable fluid flow from said reservoir through said fluid passageway to said confinement to effect expansion thereof.

21. In a safety apparatus as defined in claim 20 wherein the fluid pressure in said fluid reservoir acts on said wall means and said friable material is disposed adjacent said wall means and prevents movement of said wall means under the influence of fluid pressure in said fluid reservoir and wherein said plug member includes a portion thereon which acts in opposition to the force exerted on said friable material by the wall means in response to the pressure of the fluid in the fluid reservoir.

References Cited

UNITED STATES PATENTS

| 2,850,291 | 9/1958 | Ziccardi | 280—150 |
| 3,184,097 | 5/1965 | Kilmer et al. | 220—89X |
| 3,197,234 | 7/1965 | Bertrand | 280—150 |
| 3,257,026 | 6/1966 | Taylor | 220—89 |
| 3,268,009 | 8/1966 | Bussey et al. | 220—89X |
| 3,395,825 | 8/1968 | Cottrell | 220—47 |
| 3,413,013 | 11/1968 | Wissing et al. | 280—150 |

KENNETH H. BETTS, Primary Examiner

U.S. Cl. X.R.

137—68; 220—49, 89; 280—150